United States Patent [19]

Johnson

[11] Patent Number: 5,000,371

[45] Date of Patent: Mar. 19, 1991

[54] METHOD OF PRODUCING A METALLIC INTERFACE

[75] Inventor: James W. Johnson, Houston, Tex.

[73] Assignee: Cooper Industries, Inc., Houston, Tex.

[21] Appl. No.: 494,886

[22] Filed: Mar. 9, 1990

Related U.S. Application Data

[63] Continuation of Ser. No. 286,698, Dec. 20, 1988, abandoned, which is a continuation of Ser. No. 88,778, Aug. 24, 1987, abandoned.

[51] Int. Cl.$^5$ ............................................. B23K 31/00
[52] U.S. Cl. ................................. 228/193; 228/203; 228/230; 228/211; 148/334; 148/901
[58] Field of Search ............... 228/190, 193, 194, 203, 228/206, 227, 230, 232, 220; 419/31; 148/334, 901

[56] References Cited

U.S. PATENT DOCUMENTS

| | | |
|---|---|---|
| Re. 32,389 | 4/1987 | Becker et al. |
| 2,514,873 | 7/1950 | Keene et al. ..................... 228/190 |
| 3,386,161 | 6/1958 | Ruf ................................... 228/220 |
| 3,462,828 | 8/1969 | Winter ............................. 228/190 |
| 3,628,233 | 12/1971 | Sowko, Jr. ...................... 228/232 |
| 3,693,242 | 9/1972 | Chivinsky ....................... 228/155 |
| 4,188,237 | 2/1980 | Chasteen ........................ 228/206 |
| 4,294,395 | 10/1981 | Nayar ............................. 228/220 |
| 4,437,891 | 3/1984 | Umino et al. .................... 148/334 |
| 4,452,389 | 6/1984 | Amin .............................. 228/203 |
| 4,457,789 | 7/1984 | Wilks ............................. 148/334 |
| 4,477,955 | 10/1984 | Becker et al. |
| 4,740,255 | 4/1988 | Manton .......................... 148/334 |
| 4,906,305 | 3/1990 | McCormick et al. ........... 228/190 |

FOREIGN PATENT DOCUMENTS

| | | | |
|---|---|---|---|
| 445969 | 1/1948 | Canada ........................... 228/190 |
| 580832 | 8/1959 | Canada ........................... 228/190 |
| 2380354 | 10/1978 | France ............................. 228/220 |
| 15004 | 4/1971 | Japan .............................. 228/190 |
| 5380 | 3/1979 | Japan .............................. 228/190 |
| 35750 | 4/1981 | Japan .............................. 148/334 |
| 50797 | 5/1981 | Japan .............................. 228/211 |
| 115991 | 7/1982 | Japan .............................. 228/190 |
| 884913 | 11/1981 | U.S.S.R. ......................... 228/227 |

OTHER PUBLICATIONS

Metals Handbook Ninth Edition, vol. 4, p. 21, "Furnace Atmospheres", copyright 1981.
Tempil Division, "Basic Guide to Ferrous Metallurgy", Big Three Industries, Inc, South Plainfield, N.J., 1977.
Metals Handbook Ninth Edition, vol. 4, pp. 14–27, "Annealing of Steel", copyright 1981.
Metals Handbook Ninth Edition, vol. 6, pp. 672–691, 1983.
Metals Handbook, 8th Edition, vol. 1, p. 68, 1961.

*Primary Examiner*—Sam Heinrich
*Attorney, Agent, or Firm*—Ned L. Conley; David A. Rose; William E. Shull

[57] ABSTRACT

A method for producing a metallic interface suitable for overlaying consists of exposing the area of an alloy combination to be overlayed to a temperature above its lower critical until an element reduced zone arises. This element reduced zone more easily accepts element diffusion that takes place during overlaying. Accordingly, an improved interface, one that is more ductile and less prone to cracking, is produced.

3 Claims, 1 Drawing Sheet

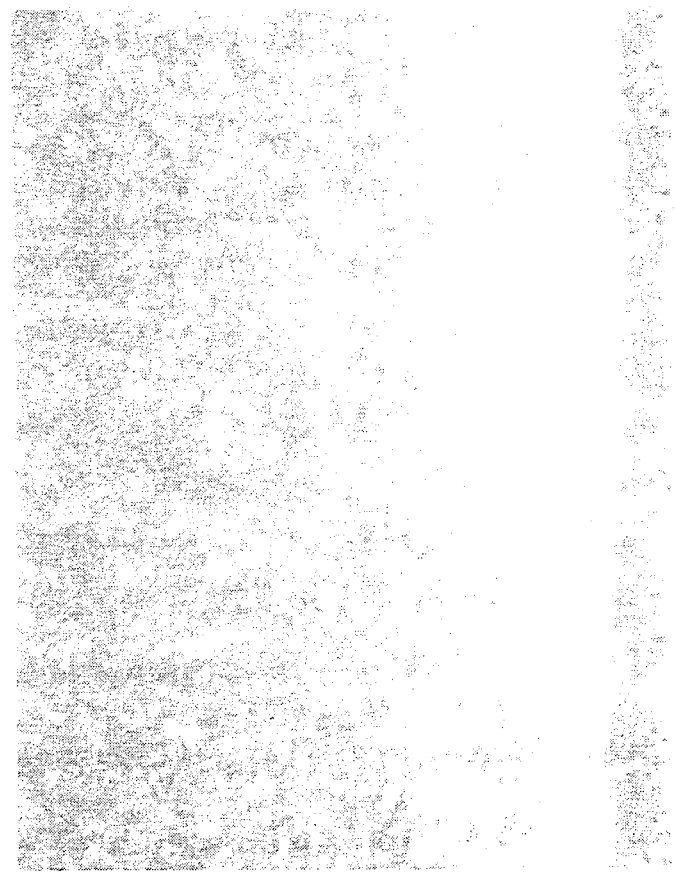

METHOD OF PRODUCING A METALLIC INTERFACE

This is a continuation of co-pending application Ser. No. 07/286,698 filed on Dec. 20, 1988, now abandoned, which is a continuation of application Ser. No. 07/088,778 filed on Aug. 24, 1987, now abandoned.

BACKGROUND OF THE INVENTION

1. Field of the Invention

The present invention relates to a method for producing a more desirable metallurgical bond when applying dissimilar metals by such thermal processes as welding, hot isostatic pressing (HIP) and diffusion.

2. Description of the Prior Art

Many alloy combinations used in various bonding processes tend to produce interfaces that have undesirable metallurgical and mechanical characteristics. A primary cause of these undesirable characteristics is element diffusion between alloy systems. Such element diffusion causes a zone of varying thickness, including diffused elements from both systems, to arise between involved alloy systems.

SUMMARY OF THE INVENTION

The present invention overcomes the shortcomings of the prior art by providing a method of producing a compatible metallic interface between dissimilar metal systems being thermally joined. In its broadest terms, the present invention comprises the step of causing a reduced element zone to arise between the dissimilar metals immediately before bonding. In a more narrowly defined embodiment, the method of the present invention is thermal in nature, involving exposing a portion of one of the dissimilar metals, an alloy combination, to a temperature above its lower critical. Such exposure is maintained for a period of time sufficient to cause surface diffusion of at least one of the constituent alloy elements. This, in effect, produces a surface zone reduced in alloy content that can more easily accept element diffusion which is known to take place during bonding. Production of such a surface zone leads directly to an interface with less total alloy, less residual stresses, increased ductility and decreased proneness to cracking.

BRIEF DESCRIPTION OF THE DRAWING

The invention will now be more fully described, by way of example, with reference to the accompanying drawing in which the sole figure is a microphotograph of a cross-section of an interface produced by the method of the present invention.

DESCRIPTION OF THE INVENTION

EXAMPLE

A typical example of the method of the present invention would be HIP cladding of Inconel 625 to an alloy steel system such as 2¼ Cr-1Mo. The figure shows such a steel system after execution of the method of the present invention. Three clearly defined areas can be seen in the figure. The darkest area, on the far right, is the surface of the steel system to which Inconel 625 could be HIP clad. In accordance with the teachings of the present invention, that surface is exposed to a temperature above the known lower critical temperature for a 2¼ CR-1Mo alloy steel system. Such exposure is maintained until, as can be seen with further reference to the figure, an element reduced zone (the light rectangular area) is caused to form. Of course, uniform exposure of the surface of the steel system causes such a uniform deep zone to form, which, because of such factors as predictability of strength, would be desirable in most cases. This element reduced zone, because of the surface diffusion of at least one element which has taken place therein, has reduced alloy content compared to the remaining portion of the steel system, the rectangular area to the left in the figure. Because of this reduction in alloy content, the element reduced zone can more easily accept element diffusion that is known to invariably take place during overlaying, cladding and similar bonding operations. Desirable characteristics of such an interface have been found to include increased ductility and decreased proneness to cracking. Further, less residual stresses have been found within such interfaces and heat treatability is more predictable, making interface hardness easier to control and more suitable for $H_2S$ type service.

The invention is not limited to the example set forth above. The scope of the invention is defined by the following claims.

I claim:

1. A method of producing an improved metallurgical bond between steel or a steel alloy and a different steel or steel alloy or a metal system, consisting essentially of:
    heating the bonding surface of at least one of the steel or steel alloys to be bonded to a temperature above its lower critical temperature for a time sufficient to form an element reduced zone; and
    bonding the heated steel or the steel alloy to the different steel or steel alloy or the metal system.

2. The method of claim 1 wherein the bonding is done by hot isostatic pressing.

3. A method for producing an improved metallurgical bond between a 2¼ Cr-1Mo alloy steel system, which has a known lower critical temperature, and Inconel 625 comprising the steps of:
    heating the surface of said 2¼ Cr-1Mo alloy steel system to a temperature above said known lower critical temperature for said 2¼ Cr-1Mo steel system,
    maintaining said heating until an element reduced zone is caused to form immediately beneath said surface of said 2¼ Cr-1Mo alloy steel system; and
    cladding by hot isostatic pressing said Inconel 625 to said 2¼ Cr-1Mo alloy steel system.

* * * * *